United States Patent [19]
Saints et al.

[11] Patent Number: 6,097,972
[45] Date of Patent: Aug. 1, 2000

[54] METHOD AND APPARATUS FOR PROCESSING POWER CONTROL SIGNALS IN CDMA MOBILE TELEPHONE SYSTEM

[75] Inventors: Keith W. Saints; Edward G. Tiedemann, Jr., both of San Diego, Calif.

[73] Assignee: QUALCOMM Incorporated, San Diego, Calif.

[21] Appl. No.: 08/919,806

[22] Filed: Aug. 29, 1997

[51] Int. Cl.[7] .................................................. H04Q 7/20
[52] U.S. Cl. .......................... 455/572; 455/136; 455/574; 455/115; 455/296
[58] Field of Search ................................ 455/127, 126, 455/132, 136, 137, 138, 232.1, 234.1, 246.1, 572, 226.2, 115, 296

[56] References Cited

U.S. PATENT DOCUMENTS

| | | | |
|---|---|---|---|
| 3,310,631 | 3/1967 | Brown | 179/15 |
| 3,714,508 | 1/1973 | Blasbalg | 179/15 BC |
| 4,052,565 | 10/1977 | Baxter et al. | 179/1.5 S |
| 4,112,257 | 9/1978 | Frost | 179/2 EB |
| 4,123,718 | 10/1978 | Lampert et al. | 325/474 |
| 4,222,115 | 9/1980 | Cooper et al. | 375/1 |
| 4,225,976 | 9/1980 | Osbone et al. | 455/226 |
| 4,291,409 | 9/1981 | Weinberg et al. | 375/1 |
| 4,301,530 | 11/1981 | Gutleber | 370/18 |
| 4,460,992 | 7/1984 | Gutleber | 370/19 |
| 4,472,815 | 9/1984 | Gutleber | 375/34 |
| 4,495,648 | 1/1985 | Giger | 455/73 |
| 4,580,262 | 4/1986 | Naylor et al. | 371/5 |
| 4,635,221 | 1/1987 | Kerr | 364/821 |
| 4,641,322 | 2/1987 | Hasegawa | 375/1 |

(List continued on next page.)

FOREIGN PATENT DOCUMENTS

| | | | |
|---|---|---|---|
| 0412583 | 2/1991 | European Pat. Off. | H04B 1/56 |
| 0418865 | 3/1991 | European Pat. Off. | H04L 12/56 |
| 0444592 | 9/1991 | European Pat. Off. | H04B 7/212 |
| 0564937 | 10/1993 | European Pat. Off. | H04B 7/26 |
| 0671819 | 9/1995 | European Pat. Off. | |
| 0680159 | 11/1995 | European Pat. Off. | H04B 7/005 |
| 0680160 | 11/1995 | European Pat. Off. | |
| 3035625 | 2/1991 | Japan | H04B 7/26 |
| 2022365 | 12/1979 | United Kingdom | H04Q 7/04 |
| 2182528 | 5/1987 | United Kingdom | H04J 3/00 |
| 2273009 | 6/1994 | United Kingdom | |
| 9107030 | 10/1990 | WIPO | H04J 3/06 |
| 9406218 | 3/1994 | WIPO | H04B 7/005 |
| 9508901 | 3/1995 | WIPO | |

OTHER PUBLICATIONS

"Advance Engineering Mathematics", Kreyszig, Erwin, 1979, John Wiley & Sons, Section 4.7, pp. 186–190.

*Primary Examiner*—Wellington Chin
*Assistant Examiner*—Yemane Woldetatios
*Attorney, Agent, or Firm*—Russell B. Miller; Sean English; Roger W. Martin

[57] ABSTRACT

The transmitted power of a mobile telephone is established by power control bits that are transmitted in a traffic channel from a base station and that are demodulated by a rake receiver in the telephone. The rake receiver includes a plurality of demodulators that demodulate respective fingers of the traffic channel which may be caused by multipath conditions, with the power control bits from each demodulator being combined with the power control bits of the other demodulators in the rake receiver regardless of whether the demodulators are in lock with their respective fingers. The combined power control signal from a rake receiver associated with a first base station is then tested against a threshold. If the combined power is at least equal to the threshold, the combined power control signal is sent to a logic combiner. If other base stations are communicating with the mobile telephone, the combined power control signal from each of these other base stations is also sent to the logic combiner. If any power control signal commands the mobile telephone to decrease its transmitted power, it does so; otherwise, it increases its transmitted power. Alternatively, the power control bits from each demodulator in a rake receiver can be blocked if the finger energy falls below a threshold that depends on the number of fingers from the associated base station.

35 Claims, 3 Drawing Sheets

U.S. PATENT DOCUMENTS

| | | | |
|---|---|---|---|
| 4,672,658 | 6/1987 | Kavehrad et al. | 379/63 |
| 4,688,035 | 8/1987 | Gray et al. | 340/825.52 |
| 4,730,340 | 3/1988 | Frazier, Jr. | 375/1 |
| 4,765,753 | 8/1988 | Schmidt | 379/60 |
| 4,813,040 | 3/1989 | Futato | 370/111 |
| 4,872,200 | 10/1989 | Jansen | 380/34 |
| 4,901,307 | 2/1990 | Gilhousen et al. | 370/18 |
| 4,933,952 | 6/1990 | Albrieux | 375/1 |
| 4,939,745 | 7/1990 | Kirmoto et al. | 375/1 |
| 5,003,533 | 3/1991 | Watanabe | 370/85.5 |
| 5,022,046 | 6/1991 | Morrow, Jr. | 375/1 |
| 5,029,331 | 7/1991 | Hiechler et al. | 371/43 |
| 5,056,109 | 10/1991 | Gilhousen et al. | 375/1 |
| 5,068,849 | 11/1991 | Tanaka | 370/85.5 |
| 5,101,501 | 3/1992 | Gilhousen et al. | 455/33 |
| 5,103,459 | 4/1992 | Gilhousen et al. | 375/1 |
| 5,109,390 | 4/1992 | Gilhousen et al. | 375/200 |
| 5,136,586 | 8/1992 | Greenblatt | 370/110.4 |
| 5,157,672 | 10/1992 | Kondou et al. | 375/1 |
| 5,159,608 | 10/1992 | Falconer et al. | 375/1 |
| 5,204,876 | 4/1993 | Bruckert | 375/1 |
| 5,212,684 | 5/1993 | MacNamee et al. | 370/24 |
| 5,220,678 | 6/1993 | Feei | 455/69 |
| 5,245,629 | 9/1993 | Hall | 375/1 |
| 5,258,983 | 11/1993 | Lane et al. | 370/118 |
| 5,263,050 | 11/1993 | Sutterlin et al. | 375/1 |
| 5,267,262 | 11/1993 | Wheatley, III | 455/38.3 |
| 5,283,780 | 2/1994 | Schuchman et al. | 370/50 |
| 5,299,229 | 3/1994 | Zscheile et al. | 375/1 |
| 5,305,468 | 4/1994 | Bruckert et al. | 455/69 |
| 5,341,396 | 8/1994 | Higgins et al. | 375/1 |
| 5,383,219 | 1/1995 | Whealey, III | 375/1 |
| 5,390,338 | 2/1995 | Bodin et al. | 455/33.1 |
| 5,396,516 | 3/1995 | Padovani et al. | 375/225 |
| 5,414,796 | 5/1995 | Jacobs et al. | 395/23 |
| 5,465,399 | 11/1995 | Oberholtzer et al. | 455/69 |
| 5,485,486 | 1/1996 | Gilhousen et al. | 455/69 |
| 5,487,180 | 1/1996 | Ohtake | 455/54.1 |
| 5,504,773 | 4/1996 | Padovani et al. | 375/200 |
| 5,511,073 | 4/1996 | Padovani et al. | 375/200 |
| 5,528,593 | 6/1996 | English et al. | 370/84 |
| 5,548,616 | 8/1996 | Mucke et al. | 375/295 |
| 5,602,833 | 2/1997 | Zehavi | 370/209 |
| 5,629,934 | 5/1997 | Glosh et al. | 370/335 |
| 5,640,414 | 6/1997 | Blakeney, II et al. | 375/200 |
| 5,764,527 | 6/1998 | Nakamura | 364/489 |
| 5,764,687 | 6/1998 | Easton | 375/206 |

METHOD AND APPARATUS FOR PROCESSING POWER CONTROL SIGNALS IN CDMA MOBILE TELEPHONE SYSTEM

BACKGROUND OF THE INVENTION

I. Field of the Invention

The present invention relates generally to mobile telephone systems, and more particularly to methods and apparatus for controlling the transmission power of mobile telephones in code division multiple access (CDMA) mobile telephone systems.

II. Description of the Related Art

In code division multiple access (CDMA) mobile telephone systems, mobile telephones in the system using CDMA spread-spectrum principles transmit their signals over the air to base stations in the system. Details of a preferred CDMA system are set forth in U.S. Pat. No. 4,901,307 for an invention entitled "Spread Spectrum Multiple Access Communication System Using Satellite or Terrestrial Repeaters" and U.S. Pat. No. 5,103,459 for an invention entitled "System and Method for Generating Signal Waveforms in a CDMA Cellular Telephone System", assigned to the same assignee as is the present invention and incorporated herein by reference. CDMA transmissions for use in cellular communication has been standardized by the Telecommunications Industry Association publication no. TIA/EIA/IS-95-A, entitled "A Mobile Station-Base Station Compatibility Standard for Dual-Mode Wideband Spread Spectrum Cellular System (hereinafter "IS-95-A").

It is important that when multiple mobile telephones transmit their signals to a base station, the various signals which are received by a base station arrive at the base station with amplitudes that are approximately equal to each other. This is necessary to ensure that the quality of communication with each mobile station is the same. More particularly, in a CDMA communication system, each user's signal is noise to every other user, and providing for roughly equal mobile station signal power at the base station insures that no single mobile station is disproportionately contributing to the interference of other mobile stations.

To regulate the received power level of the transmitted signals from mobile telephones, a base station that is communicating with multiple mobile telephones periodically transmits, in a power control subchannel of a traffic channel, a distinct sequence of power control signals to each telephone. In current CDMA systems, a base station transmits power control signals to each mobile telephone by inserting (at a rate of 800 times per second) a single power control bit into the communication signal (referred to herein as the "traffic" signal) being transmitted by the base station. For purposes of disclosure, the power control bit will be referred to in the singular, although it is to be understood that the present discussion applies equally to instances wherein two successive power control bits are inserted into the traffic signal. The power control bit is either a logical "one" or a logical "zero", with the logic states respectively representing commands to the mobile telephone to increase or decrease the amplitude of its transmitted power by a predetermined unit amount of power. Details of such a system are set forth in U.S. Pat. No. 5,506,109 for an invention entitled "Method and Apparatus for Controlling Power in a CDMA Cellular Mobile Telephone System", assigned to the same assignee as is the present invention and incorporated herein by reference.

Signals from a base station to a mobile telephone might arrive at the mobile telephone over more than one transmission path, a phenomenon referred to as "multipath". More specifically, a base station signal might propagate over a relatively direct path to a mobile telephone, and it also might propagate over an indirect path, being reflected by buildings and the like. Each version of the signal received over a particular signal path is colloquially referred to as a "finger". To accommodate processing of multipath fingers, diversity receivers have been provided that are capable of independently demodulating each of the multipath signals and combining the demodulated signals to provide an improved estimate of the information contained in the multipath signal. A preferred diversity receiver is disclosed in U.S. Pat. No. 5,109,390 for an invention entitled "Diversity Receiver in a CDMA Cellular Telephone System", assigned to the same assignee as the present invention and incorporated herein by reference.

Accordingly, to process the various time-staggered versions of a signal, a CDMA mobile telephone includes a type of diversity receiver known as a rake receiver in which a searcher assigns a received finger to a respective one of a plurality of CDMA demodulators in a first set of demodulators, with the first set being assigned to fingers of a first base station. It is possible to know which fingers correspond to which base station, because the encoding systems (i.e., the pseudorandom noise (PN) generators) of the base stations are staggered from each other by a known and relatively large amount, generally represented as a number of PN "chips". Likewise, when the signal is received from a second base station in addition to the first, a searcher assigns received fingers from the second base station to a second set of demodulators in the rake receiver.

Moreover, when a mobile telephone is located roughly between two base stations, communication with the mobile telephone is "handed off" from one base station to the other base station during the mobile telephone's transit between the two base stations. Handoffs come in two varieties. In a hard handoff, the mobile station breaks of communication with the base station cell being exited before establishing a communication link with the base station cell being entered. In contrast, in a soft handoff, the mobile station establishes communication with the cell being entered before terminating communication with the cell being exited. The preferred method for performing soft handoff is described in detail in U.S. Pat. No. 5,101,501 for an invention entitled "Method and System for Performing a Soft Handoff in Communications in a CDMA Cellular Communication System", assigned to the same assignee as the present invention and incorporated herein by reference.

During a soft hand off procedure, there is a time period in which both base stations broadcast the same signal to the mobile telephone. Thus, not only can a mobile telephone receive a signal from a single base station over multiple paths, but it can receive the same signal from two base stations. Consequently, the mobile telephone can receive several versions of the same signal.

Accordingly, a mobile station that is in soft handoff with two or more base stations receives the same data signal over traffic channels from each base station, but receives independent power control commands in the power control subchannels from the respective base stations. Consequently, it can happen that one base station might command the mobile telephone to increase its transmitted power, whereas another base station might simultaneously command the mobile telephone to decrease its transmitted power. A mobile station conforming to the IS/95-A standard is required to decrease its power if any base station issues a "decrease" power control command, regardless of what the other base stations might command. This convention is colloquially referred to in logic terms as the "OR of the downs" rule.

There are two situations in which a mobile station can receive multiple signal components that contain the same power control command. The first is when a mobile station receives two or more multipath signal components from the same base station, in which case it is clear that the power control bits contained in each component are identical. Additionally, when sectorized base stations are used, and a mobile station receives signals from two or more sectors of the same base station (a situation commonly referred to as a "softer" handoff), identical power control bits are transmitted from each sector. In either case, the mobile station combines all received power control signals that originate from the same base station to yield a single overall estimate of the power control command sent from that base station. This combining of power control signals increases the reliability of the estimate of the command, and it is performed before applying the "OR of the downs" rule to independent power control bits that have been received from different base stations.

When power control signals from multiple base stations have been received by a mobile station, if the signal from one of the base stations is insufficient for the mobile station to make a reliable decision for the command represented by the respective power control signal, the mobile station should exclude the base station's power control command from the "OR of the downs" rule. Otherwise, the decision rendered from the weak signal, while being consequently unreliable, would nevertheless have influence in controlling the mobile station's transmitted power. Therefore, a mobile station should have a mechanism for excluding, from consideration in the "OR of the downs" rule, power command decisions that are based on weak power control signals.

Current implementations of mobile stations use a "finger lock" mechanism to exclude unreliable power control signals from the decision logic. On each finger of the RAKE receiver, the demodulated signal energy is compared to a threshold which represents a minimum energy required to reliably use power control data from that finger. If the demodulated signal energy exceeds the minimum threshold, the finger is said to be "in lock". Otherwise, the finger is said to be "out of lock". When the power control signals received on distinct fingers but originating from the same base station are combined, as described above, only those fingers which are in lock are considered. Accordingly, a base station is excluded from the "OR of the downs" rule at any moment in which there is no demodulating finger currently in lock with a signal from that base station.

The present invention recognizes, however, that although weak signals should be excluded from the final decision used in the "OR of the downs" rule, the decision to exclude these weak signals can be deferred until after they have been combined with other signals from the same base station to thereby potentially render a reliable input to the "OR of the downs" logic. Thus, in the present invention, all fingers receiving signals from a base station will be considered to form a combined estimate of the power control command from the base station. Then, the aggregate energy from all of the fingers is compared to a minimum threshold to determine whether the aggregate energy possess sufficient energy to be included in the "OR of the downs" rule.

Accordingly, it is an object of the present invention to provide a system for controlling the transmitted power of a mobile telephone. A further object of the present invention is to provide a system for controlling the transmitted power of a mobile telephone which uses power control bits from rake receiver demodulators that are not necessarily locked onto their respective fingers. Still another object of the present invention is to provide a system for controlling the transmitted power of a mobile telephone that is easy to use and cost-effective to manufacture and implement.

SUMMARY OF THE INVENTION

A mobile telephone is disclosed for receiving signals from a base station. The mobile telephone includes a searcher and a first demodulator controlled by the searcher for demodulating a first signal from the base station, wherein the first signal propagates to the mobile telephone via a first path. A second demodulator is controlled by the searcher for demodulating a second signal from the base station. The second signal propagates to the mobile telephone via a second path. A combiner combines corresponding power control bits from the first and second signals regardless of whether the respective demodulator is in lock with the respective signal to thereby generate a first power command. In turn, a processor passes the first power command when a comparison energy at least equals an energy threshold, and otherwise the processor blocks the first power command.

In a preferred embodiment, a switch is controlled by the processor for passing and blocking the first power command. Preferably, the switch is a first switch and the signal can be received from a second base station. Accordingly, the telephone further includes means for generating a second power command in response to the signal received from the second base station. Additionally, the telephone includes a second switch which is controlled by the processor for passing and blocking the second power command. Further, the telephone preferably includes an OR gate for receiving the power commands and generating a power control signal in response thereto. As intended by the present invention, the power control signal causes an increase or decrease in a transmitted power of the mobile telephone.

In one embodiment, the comparison energy is based on the energy of the first power command. In an alternate embodiment, the comparison energy is based on the energy of the first and second signals. The telephone is further disclosed in combination with a mobile telephone system.

In another aspect, a mobile telephone for receiving a signal from a base station includes a searcher and a rake receiver. In turn, the rake receiver includes a plurality of demodulators that are controlled by the searcher for demodulating respective signal fingers from the base station, with each signal finger propagating to the mobile telephone via a respective path. A processor passes a power control bit from a signal only when an energy associated with the signal at least equals an energy threshold. In accordance with the present invention, the energy threshold is established in response to the number of fingers input to the rake receiver.

In still another aspect, a communication device includes a rake receiver including demodulators for demodulating a plurality of fingers of a signal from a base station. As disclosed in detail below, the signal includes power control bits. Also, a combiner is provided for combining corresponding power control bits from the demodulators regardless of whether the demodulators are in lock with their respective fingers to thereby generate a first power command.

In yet another aspect, a method is disclosed for establishing a transmitted power of a mobile telephone in a mobile telephone system having at least first and second base stations, with each base station transmitting a common traffic signal to the mobile telephone. The method includes demodulating a first finger of the traffic signal from the first base station, and demodulating a second finger of the traffic signal from the first base station. Then, the method includes combining corresponding power control bits from the first and second fingers regardless of the strengths of the fingers to thereby generate a first power command. The first power command is passed when a comparison energy at least equals an energy threshold, and otherwise the first power command is blocked. A computer logic device is also disclosed which executes the novel steps of the present invention.

In another aspect of the present invention, a method for establishing a transmitted power of a mobile telephone in a mobile telephone system having at least first and second base stations, each transmitting a common traffic signal to the mobile telephone, includes demodulating respective signal fingers from the first base station, and passing a power control bit from a finger only when an energy associated with the finger at least equals an energy threshold. The energy threshold is established in response to the number of fingers. A computer logic device is also disclosed which executes the novel steps of the present invention.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
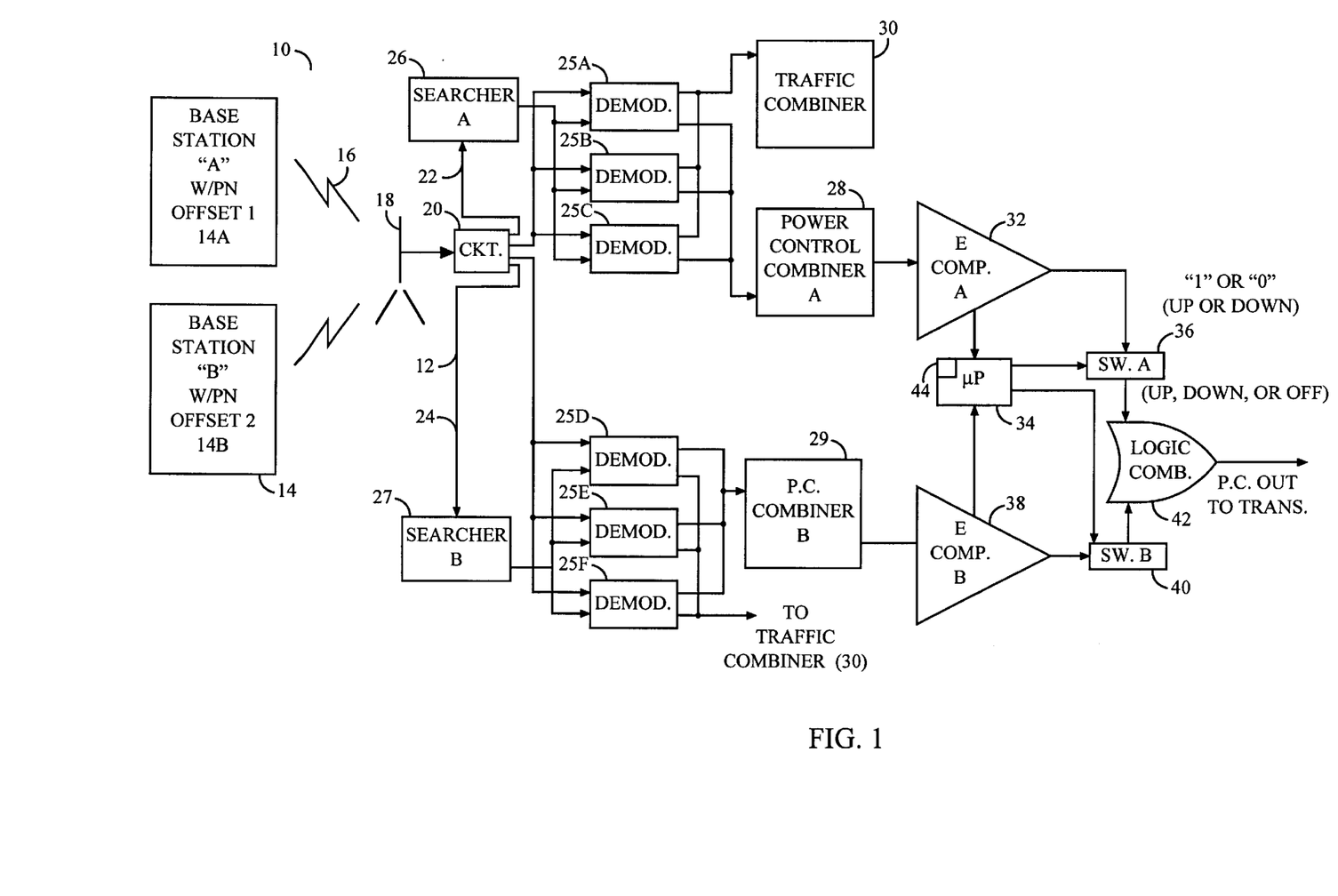
FIG. 1 is a schematic diagram of the mobile telephone transmission power control system of the present invention.

Referring initially to FIG. 1, a mobile telephone system is shown, generally designated 10, in which the transmission power of a mobile telephone, generally designated 12, is controlled in accordance with the novel invention disclosed herein. As shown in FIG. 1, the system 10 includes a plurality of base stations 14. For simplicity, two base stations 14A, 14B are shown and described herein, although it is to be understood that the principles of the present invention apply to a greater number of base stations than shown.

Additionally, the system 10 includes a plurality of mobile telephones 12, although for clarity of disclosure only a single mobile telephone 12 is shown and disclosed herein. It is to be understood that the present system preferably is a code division multiple access (CDMA) system as disclosed in the above-referenced U.S. Pat. Nos. 4,901,307 and 5,103,459. Accordingly, a base station 14 communicates with the mobile telephone 12 via a traffic channel 16. Base station 14 sends, within its traffic signal, power control bits to mobile telephone 12 which command mobile telephone 12 either to increase or decrease its transmitted power by a predetermined incremental power amount, to improve the total system-wide communication quality with base stations 14. In accordance with CDMA principles, when two base stations 14A, 14B are in communication with the mobile telephone 12 as shown in FIG. 1, each base station 14 attempts to establish the transmission power of the mobile telephone 12 as appropriate for that particular base station 14.

In further accord with principles well-known in the art, the mobile telephone 12 includes an antenna 18 and front end circuitry 20 which downconverts, filters, and amplifies the received signal. Signals from the first base station 14A (including both multipath signals and signals from separate sectors of the same base station) are sent to a first portion, generally designated 22, of a rake receiver, while signals from the second base station 14B are sent to a second portion, generally designated 24, of the rake receiver. The rake receiver portions 22, 24 are identical in configuration and operation to each other.

As shown in FIG. 1, the first rake receiver portion 22 includes a plurality of demodulators, with the number of demodulators allocated for the purpose of receiving signals from base station 14A and base station 14B being variable. For disclosure purposes, the first rake receiver portion 22 includes first through third demodulators 25a–c, while the second rake receiver portion 24 includes fourth through sixth demodulators 25d–f. An "A" searcher 26 is connected to the circuitry 20 and to the first through third demodulators 25a–c for assigning respective signal "fingers" from the first base station 14A to the demodulators 25a–c as is described in detail in the above-mentioned U.S. Pat. No. 5,109,390. Likewise, a "B" searcher 27 is connected to the circuitry 20 and to the fourth through sixth demodulators 25d–f for assigning respective signal "fingers" from the second base station 14B to the demodulators 25d–f as is described in detail in the above-mentioned U.S. Pat. No. 5,109,390.

As mentioned earlier, the various signal fingers from the first base station 14A are caused by multipath propagation of the signal from the base station 14A to the mobile telephone 12, or from the same signal being received from two directional transmitters, referred to as "sectors", of the same base station. When a mobile station is in simultaneous communication with two sectors of the same base station, the condition, as noted above, is referred to as a "softer" handoff. A method for performing a softer handoff in a CDMA communication system is described in detail in co-pending U.S. patent application Ser. No. 08/405,611 for and invention entitled "Method and Apparatus for Performing Handoff Between Sectors of a Common Base Station", filed Mar. 5, 1995, assigned to the same assignee as the present invention and incorporated by reference herein.

As discussed further below, the demodulators 25a–f demodulate their respective fingers in accordance with CDMA demodulation principles wellknown in the art. Each of the first through third demodulators 25a–c sends its demodulated power control bits to an "A" digital power control combiner 28, whereas each of the fourth through sixth demodulators 25d–f sends its demodulated power control bits to a "B" digital power control combiner 29. On the other hand, each of the first through sixth demodulators 25a–f sends its demodulated traffic bits to a common digital traffic combiner 30, which combines traffic data for the mobile telephone 12 from all base stations 14, since the traffic data from each base station 14 (for the particular mobile telephone 12) is the same as the traffic data for the telephone 12 from the other base stations in the system. The combiners 28, 29, 30 combine the signals sent to them from the demodulators 25a–f.

Of interest to the present invention is the processing of power control bits, and so FIG. 1 shows that the output of the "A" power control combiner 28 is sent to an "A" energy comparator 32, and the output of the "B" power control combiner 29 is sent to a "B" energy comparator 38. The energy comparators 32, 38 compare the energy of the signals from the respective power control combiners 28, 29 to a predetermined threshold, and send the comparison to a digital processing apparatus, such as a microprocessor 34. Thus, the outputs of the energy comparators 32, 38 are binary ones or zeroes, respectively indicating whether the power control command from the particular base station is to increase (an "up" signal) or decrease (a "down" signal) mobile telephone 12 transmitted power.

As can be appreciated in reference to FIG. 1, the microprocessor 34 controls the operation of an "A" switch 36 and a "B" switch 40, to either pass or block an "up" or "down" signal from the respective power control combiners 28, 29 in response to the comparison signal from the respective energy comparators 32, 38. The logic by which the microprocessor 34 controls the switches 36, 40 is disclosed further below. When a switch 36, 40 passes an "up" or "down" power control signal, the power control signal is sent to a logic combiner 42 as shown. Stated differently, the switches 36, 40 pass to the logic combiner 42 either an "up" or a "down" signal, or a "disable" signal indicating that the microprocessor 34 has disabled the output of the particular switch 36, 40.

It is to be understood that the logic combiner 42 undertakes the above-disclosed "OR of the downs" logic to output a signal to cause the mobile telephone 12 to increase or decrease its transmitted power. Specifically, when all of the power control signals received by the logic combiner 42 indicate that the transmitter of the mobile telephone 12 is to increase its power, the logic combiner 42 outputs a power command to cause the transmitted power to increase. Otherwise, the logic combiner 42 outputs a power command to cause the transmitted power to decrease.

FIG. 1 also shows that the microprocessor 34 preferably includes a data storage device 44, which includes instructions that are used by the microprocessor 34 to undertake the steps of the present invention. Accordingly, those skilled in the art will recognize that the microprocessor 34 can include a programmable central processing unit (CPU), or a programmable gate array chip, or an application specific integrated circuit (ASIC).

Figure 3:
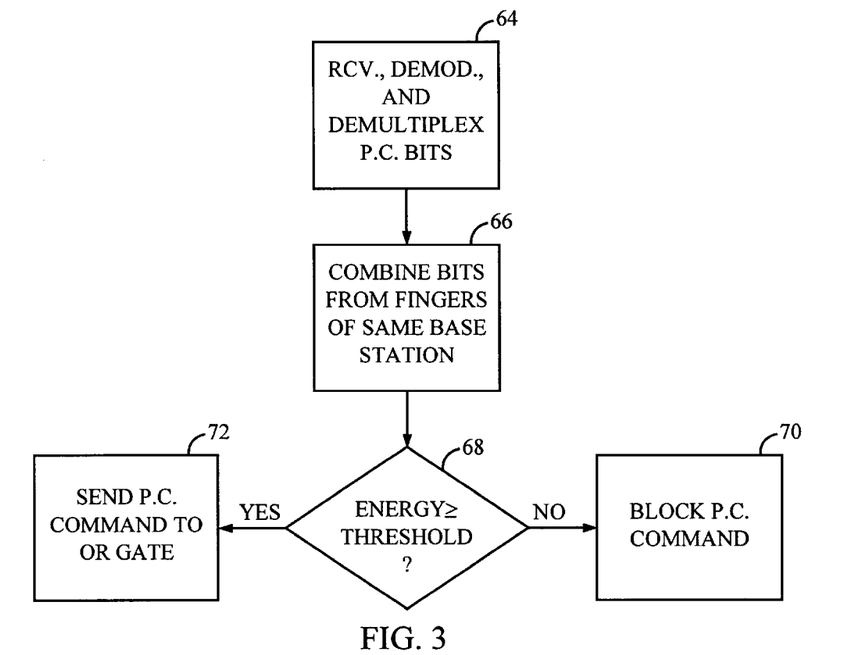
FIG. 3 is a flow chart showing the preferred power control bit combination method.
Figure 4:
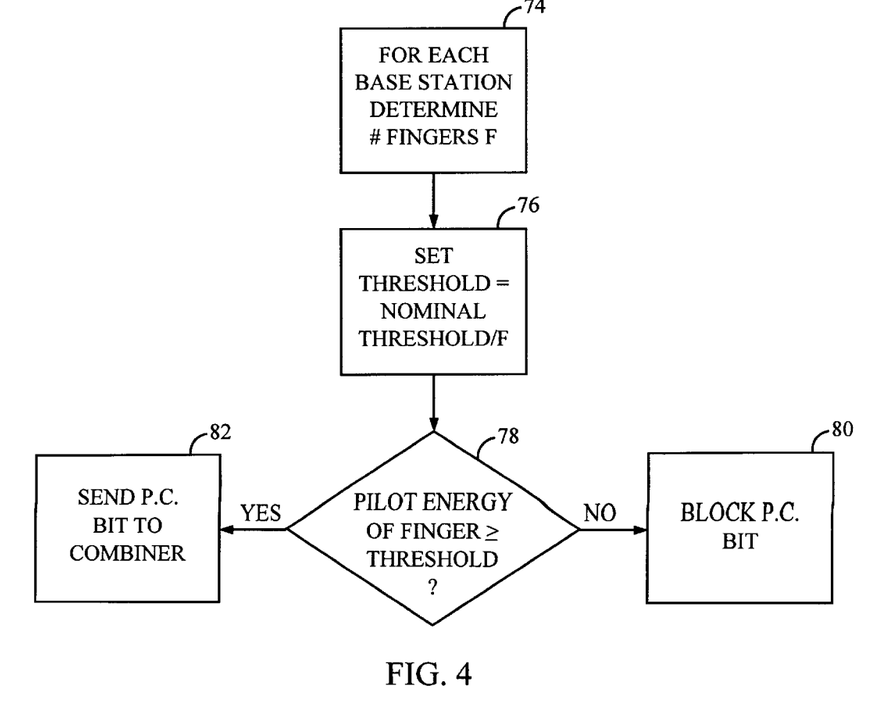
FIG. 4 is a flow chart showing an alternative power control bit combination method.

FIGS. 3 and 4 illustrate the structures of various embodiments of the logic of the present invention as embodied in computer-readable logic structures on the storage device 44 (FIG. 1). Those skilled in the art will appreciate that the FIGS. illustrate the structures of logic elements that function according to this invention. Manifestly, the invention is practiced in one essential embodiment by a machine component that renders the logic elements in a form that instructs a digital processing apparatus (that is, a computer or microprocessor) to perform a sequence of operational steps corresponding to those shown in the FIGS.

These instructions may reside in, i.e., be embodied by, logic structures/circuits on a data storage device including a data storage medium, such as the storage device 44 shown in FIG. 1. The machine component can be a combination of logic elements that are embodied in the storage device 44, which advantageously can be electronic read-only memory (ROM) or electronic random access memory (RAM), or other appropriate data storage device. Alternatively, the instructions can be embodied in the form of computer program code elements on semiconductor devices, on magnetic tape, on optical disks, on a DASD array, on magnetic tape, on a conventional hard disk drive, on electronic read-only memory or on electronic random access memory, or other appropriate data storage device.

Figure 2:
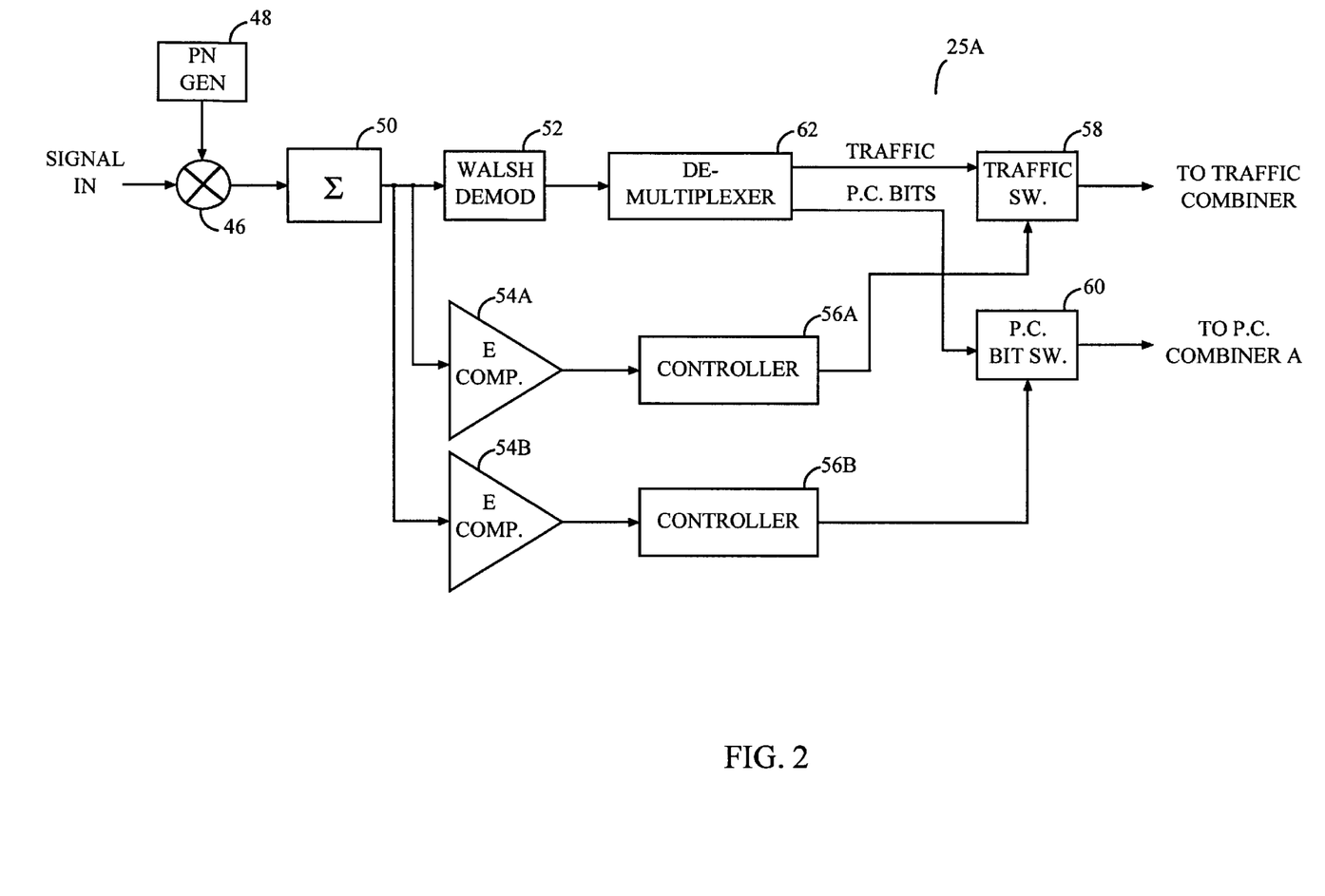
FIG. 2 is a schematic diagram of one of the demodulators of the present invention.

Now referring to FIG. 2, the structure of a demodulator of the present invention can be seen. It is to be understood that the demodulators of the rake receiver of the present invention are identical to each other in construction and operation. Accordingly, the first demodulator 25a is shown and described in FIG. 2 an exemplary demodulator of the present invention.

As shown in FIG. 2, the signal which is input to the demodulator 25a is sent to a digital multiplier 46. In accordance with well-known CDMA principles, the multiplier 46 outputs the product of the input signal and a pseudorandom noise (PN) code that is generated by a PN generator 48. This output product is a partially demodulated version of the signal input to the demodulator A1.

In turn, the output of the multiplier 46 is sent to a digital accumulator 50. From the accumulator 50, the signal is sent along three paths, the first path including a so-called Walsh demodulator 52 which further processes the signal in accordance with conventional CDMA principles. The signal along the second path is sent to a traffic lock mechanism that includes a traffic energy comparator 54a for comparison of the energy of the signal output from the accumulator 50 with a predetermined threshold. From the traffic energy comparator 54a, the signal is sent to a digital processing apparatus, such as a traffic controller 56a. As can be appreciated in reference to FIG. 2, the traffic controller 56a controls the operation of a traffic switch 58, the output of which is sent to the common traffic combiner 30 shown in FIG. 1.

On the other hand, the signal along a third path from the accumulator 50 is sent to a power control lock mechanism that includes a power control energy comparator 54b for comparison of the energy of the signal output from the accumulator 50 with a predetermined threshold. From the power control energy comparator 54b, the signal is sent to a digital processing apparatus, such as a power control controller 54b. As can be appreciated in reference to FIG. 2, the power control controller 54b controls the operation of a power control bit switch 60, the output of which is sent to the "A" power control combiner 28 shown in FIG. 1.

Returning to the first path from the accumulator 50, the output of the Walsh demodulator 52 is sent to a digital demultiplexer 62. The demultiplexer 62 separates power control signals in the signal from traffic signals. The power control signals are sent as shown to the power control switch 60, whereas the traffic bits are sent to the traffic switch 58.

In accordance with the present invention, based on the signal from the power control energy comparator 54b, the power control controller 54b determines whether the first demodulator 25a is "in lock" for power control with its respective signal finger. When the first demodulator 25a is in lock for power control, the power control controller 54b causes the power control switch 60 to pass its power control signal on to the "A" power control combiner 28 shown in FIG. 1. Similarly, based on the signal from the traffic comparator 54a, the traffic 56a determines whether the first demodulator 25a is "in lock" for traffic data with its respective signal finger. When the first demodulator 25a is in lock for traffic data, the traffic controller 56a causes traffic switch 58 to pass its traffic signal on to the traffic combiner 30 shown in FIG. 1.

On the other hand, when the demodulator 25a is "out of lock" with its signal finger for traffic data as determined by the traffic controller 56a based on the signal from the traffic energy comparator 54a, the traffic controller 56a causes the traffic switch 58 to block the traffic signal from the traffic combiner 30. In contrast, when the demodulator 25a is "out of lock" for power control with its signal finger, the power control controller 54b causes the power control switch 60 to nevertheless pass the power control signal to the "A" power control combiner 28.

It is to be understood that in the embodiment discussed herein, the power control switch 60 can be omitted, or disabled by establishing its threshold to be zero. Or, the power control switch 60 can be combined with the traffic control switch 58 into a single switch (not shown), with the controller 56 operating the switch to selectively pass traffic signals based on whether the demodulator is in lock for traffic control, and with the controller 56 operating the switch to always pass power control signals regardless of whether the demodulator is in lock for power control.

Now referring to FIG. 3, the method is shown by which the present invention combines power control bits which are received from a single base station over various multipaths. At block 64, the multipath signals are received, separately demodulated, and the power control bits demultiplexed therefrom, as disclosed above.

Next, at block 66 the operation of the "A" power control combiner 28 (FIG. 2) causes all power control signals from a demodulator that is in lock for power control to be combined with corresponding power control signals from the other locked demodulators that are assigned to fingers of a common base station. Then, at decision diamond 68, the microprocessor 34 (FIG. 1) determines whether the energy of the combined power control signal at least equals a predetermined threshold.

In one presently preferred embodiment, the comparison energy is based on the energy of the combined power control signal received by the "A" energy comparator 32 (FIG. 1). In other words, it is the energy of the combined power control signal that can be compared to a threshold at decision diamond 68. Alternatively, the comparison energy can be based on the energy of the signal fingers prior to demultiplexing, as indicated by the power control energy comparators 54b of the demodulators of the present invention. Or, the energy of the entire received signal, with both traffic and power control signals, can be compared to a threshold at decision diamond 68.

If it is determined at decision diamond 68 that the energy does not at least equal a predetermined threshold, the logic of the microprocessor 34 moves to block 70 to operate the "A" switch 36 to block (or to indicate as being disabled) the power control command generated by the "A" power control combiner 28 from passing to the logic combiner 42. If, on the other hand, it is determined at decision diamond 68 that the energy is at least equal the predetermined threshold, the logic of the microprocessor 34 moves to block 72 to operate the "A" switch 36 to pass the power control command generated by the "A" power control combiner 28 to the logic combiner 42.

In an alternate embodiment, the energy comparators 32, 38 and switches 36, 40 (FIG. 1) can be dispensed with. In this alternate embodiment, the power control controller 54b (FIG. 2) of each demodulator selectively passes power control signals, with the comparison threshold being dynamically established based on the number of received signal fingers. Stated differently, the energy threshold is established in response to the number of signals from a single base station that are input to the rake receiver of the present invention.

FIG. 4 shows the logic of such an embodiment. Commencing at block 74, for each base station being received by the mobile telephone 12 the controller 54b of each demodulator determines how many fingers (represented by an integer "F") are currently being received. Moving to block 76, the predetermined threshold is set equal to its nominal value, divided by the number "F" of fingers being received from the base station.

Next, at decision diamond 78 each demodulator controller 54b determines whether the pilot energy of its associated finger is at least equal to the threshold determined at block 76. If it isn't, the logic of the controller 54b moves to block 80 to control the associated power control switch 60 to block the power control signal from further processing. Otherwise, the logic of the controller 54b moves to block 82 to control the associated power control switch 60 to pass the power control signal on to the power control combiner 28 (FIG. 1).

While the particular METHOD AND APPARATUS FOR PROCESSING POWER CONTROL SIGNALS IN CDMA MOBILE TELEPHONE SYSTEM as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more".

What is claimed is:

1. A mobile telephone for receiving signals from a base station, comprising:
   a searcher;
   a first demodulator controlled by the searcher for demodulating a first signal from the base station, the first signal propagating to the mobile telephone via a first path;
   a second demodulator controlled by the searcher for demodulating a second signal from the base station, the second signal propagating to the mobile telephone via a second path;
   a combiner for combining corresponding power control bits from the first and second signals regardless of whether the respective demodulator is in lock with the respective signal to thereby generate a first power command; and
   a processor for passing the first power command when a comparison energy at least equals an energy threshold, and otherwise blocking the first power command.

2. The telephone of claim 1, further comprising a switch controlled by the processor for passing and blocking the first power command.

3. The telephone of claim 2, wherein the switch is a first switch, the signal is received from a second base station, and the telephone further comprises:
   means for generating a second power command in response to the signal received from the second base station;
   a second switch controlled by the processor for passing and blocking the second power command; and
   a logic combiner for receiving the power commands and generating a power control signal in response thereto, the power control signal causing an increase or decrease in a transmitted power of the mobile telephone.

4. The telephone of claim 1, wherein the comparison energy is based on the energy of the first power command.

5. The telephone of claim 1, wherein the comparison energy is based on the energy of the first and second signals.

6. The telephone of claim 3, in combination with a mobile telephone system.

7. A mobile telephone for receiving a signal from a base station, comprising:

a searcher;

a rake receiver including a plurality of demodulators controlled by the searcher for demodulating respective signal fingers from the base station, each signal finger propagating to the mobile telephone via a respective path; and a processor for passing a power control bit from a signal only when an energy associated with the signal at least equals an energy threshold, the energy threshold being established in response to the number of signals input to the rake receiver.

8. The telephone of claim 7, further comprising a plurality of power control switches associated with respective demodulators and controlled by the processor for passing and blocking power control bits from the respective demodulators; and a combiner for combining corresponding power control bits from the switches to thereby generate first power commands.

9. The telephone of claim 8, wherein the base station is a first base station and the signal is received from a second base station, and the telephone further comprises:

means for generating a second power command in response to the signal received from the second base station; and a logic combiner for receiving the power commands and generating a power control signal in response thereto, the power control signal causing an increase or decrease in a transmitted power of the mobile telephone.

10. The telephone of claim 9, in combination with a mobile telephone system.

11. A communication device, comprising:

a rake receiver including demodulators for demodulating a plurality of fingers of a signal from a base station, the signal including power control bits; and a combiner for combining corresponding power control bits from the demodulators regardless of whether the demodulators are in lock with their respective fingers to thereby generate a first power command.

12. The device of claim 11, further comprising:

a processor for passing the first power command when a comparison energy at least equals an energy threshold, and otherwise blocking the first power command.

13. The device of claim 12, further comprising a switch controlled by the processor for passing and blocking the first power command.

14. The device of claim 13, wherein the switch is a first switch, the signal is received from a second base station, and the device further comprises:

means for generating a second power command in response to the signal received from the second base station;

a second switch controlled by the processor for passing and blocking the second power command; and a logic combiner for receiving the power commands and generating a power control signal in response thereto, the power control signal causing an increase or decrease in a transmitted power of the device.

15. The device of claim 12, wherein the comparison energy is based on the energy of the first power command.

16. The device of claim 12, wherein the comparison energy is based on the energy of the fingers.

17. The device of claim 11, in combination with a mobile telephone system.

18. A method for establishing a transmitted power of a mobile telephone in a mobile telephone system having at least first and second base stations, each transmitting a common traffic signal to the mobile telephone, comprising the steps of:

demodulating a first finger of the traffic signal from the first base station, the first finger propagating to the mobile telephone via a first path;

demodulating a second finger of the traffic signal from the first base station, the second finger propagating to the mobile telephone via a second path;

combining corresponding power control bits from the first and second fingers regardless of the strengths of the fingers to thereby generate a first power command; and passing the first power command when a comparison energy at least equals an energy threshold, and otherwise blocking the first power command.

19. The method of claim 18, further comprising the steps of:

generating a second power command in response to the traffic signal received from the second base station; and generating a power control signal in response to the power commands, the power control signal causing an increase or decrease in the transmitted power of the mobile telephone.

20. The method of claim 18, comprising basing the comparison energy on the energy of the first power command.

21. The method of claim 18, comprising basing the comparison energy on the energy of the first and second fingers.

22. A method for establishing a transmitted power of a mobile telephone in a mobile telephone system having at least first and second base stations, each transmitting a common traffic signal to the mobile telephone, comprising the steps demodulating respective signal fingers from the first base station, each signal finger propagating to the mobile telephone via a respective path; and passing a power control bit from a finger only when an energy associated with the finger at least equals an energy threshold, the energy threshold being established in response to the number of fingers.

23. The method of claim 22, further comprising the steps of:

combining corresponding power control bits from the fingers to thereby generate first power commands.

24. The method of claim 23, further comprising the steps of:

generating second power commands in response to signals received from the second base station; and generating power control signals in response to the power commands, the power control signal causing an increase or decrease in the transmitted power of the mobile telephone.

25. In a mobile telephone in a mobile telephone system having at least first and second base stations, each base station transmitting a common traffic signal to the mobile telephone, a computer logic device comprising:

a computer logic storage device readable by a digital processing system; and     instructions embodied in the logic storage device, the instructions being executable by the digital processing system for performing method steps for establishing a transmitted power of the mobile telephone, the method steps comprising:

demodulating a first finger of the traffic signal from the first base station, the first finger propagating to the mobile telephone via a first path;

demodulating a second finger of the traffic signal from the first base station, the second finger propagating to the mobile telephone via a second path;

combining corresponding power control bits from the first and second fingers regardless of the strengths of the fingers to thereby generate a first power command; and     passing the first power command when a comparison energy at least equals an energy threshold, and otherwise blocking the first power command.

26. The computer logic device of claim 25, wherein the method steps further comprise:

generating a second power command in response to the traffic signal received from the second base station; and     generating a power control signal in response to the power commands, the power control signal causing an increase or decrease in the transmitted power of the mobile telephone.

27. The computer logic device of claim 26, wherein the method steps comprise basing the comparison energy on the energy of the first power command.

28. The computer logic device of claim 26, wherein the method steps comprise basing the comparison energy on the energy of the first and second fingers.

29. The computer logic device of claim 25, in combination with the mobile telephone.

30. The combination of claim 29, in further combination with a mobile telephone system.

31. In a mobile telephone in a mobile telephone system having at least first and second base stations, each base station transmitting a common traffic signal to the mobile telephone, a computer logic device comprising:

a computer logic storage device readable by a digital processing system; and     instructions embodied in the logic storage device, the instructions being executable by the digital processing system for performing method steps for establishing a transmitted power of the mobile telephone, the method steps comprising:

demodulating respective signal fingers from the first base station, each signal finger propagating to the mobile telephone via a respective path; and     passing a power control bit from a finger only when an energy associated with the finger at least equals an energy threshold, the energy threshold being established in response to the number of fingers.

32. The computer logic device of claim 31, wherein the method steps further comprise:

combining corresponding power control bits from the fingers to thereby generate first power commands.

33. The computer logic device of claim 32, wherein the method steps further comprise:

generating second power commands in response to signals received from the second base station; and     generating power control signals in response to the power commands, the power control signal causing an increase or decrease in the transmitted power of the mobile telephone.

34. The computer logic device of claim 31, in combination with the mobile telephone.

35. The combination of claim 34, in further combination with a mobile telephone system.

\* \* \* \* \*